United States Patent [19]
Gaughan et al.

[11] Patent Number: 5,731,648
[45] Date of Patent: Mar. 24, 1998

[54] LAMINATED ROTOR CORE FOR MOUNTING PERMANENT RING MAGNETS

[75] Inventors: Brian F. Gaughan, Yellow Springs; L. Jay Batten, Lebanon, both of Ohio

[73] Assignee: Globe Motors, Dayton, Ohio

[21] Appl. No.: 552,340

[22] Filed: Nov. 2, 1995

[51] Int. Cl.$^6$ ........................ H02K 21/12
[52] U.S. Cl. ............... 310/216; 310/51; 310/52; 310/61; 310/216; 310/261; 310/264; 310/265; 310/156
[58] Field of Search .................. 310/51, 52, 57, 310/58, 61, 64, 87, 91, 156, 216, 218, 261, 264, 265, 268

[56] References Cited

U.S. PATENT DOCUMENTS

| | | | |
|---|---|---|---|
| 3,258,623 | 6/1966 | Phelon et al. | 310/156 |
| 3,323,763 | 6/1967 | Butts | 248/15 |
| 3,802,068 | 4/1974 | Scott | 29/598 |
| 4,594,525 | 6/1986 | Stokes | 310/156 |
| 4,642,502 | 2/1987 | Carpenter et al. | 310/156 |
| 5,047,680 | 9/1991 | Torok | 310/156 |
| 5,402,024 | 3/1995 | Watanabe et al. | 310/156 |
| 5,402,025 | 3/1995 | Saito et al. | 310/156 |

FOREIGN PATENT DOCUMENTS

| | | | |
|---|---|---|---|
| 343457 | 11/1989 | European Pat. Off. | 310/156 |
| 0650241 | 4/1995 | European Pat. Off. | 310/156 |
| 1614183 | of 1970 | Germany | 310/156 |
| 3137981 | 4/1983 | Germany | 310/156 |
| 63-114550 | 5/1988 | Japan | 310/156 |
| 6-331384 | 2/1994 | Japan | 310/156 |
| 2007146 | 5/1979 | United Kingdom | 310/156 |

*Primary Examiner*—Steven L. Stephan
*Assistant Examiner*—Karl E. Tamai
*Attorney, Agent, or Firm*—Biebel & French

[57] ABSTRACT

One aspect of the invention is a rotor core for use with a permanent ring magnet in an electric motor which serves to minimize and evenly distribute thermal stresses in the rotor without undermining the efficiency of the motor by distorting the flux return to the ring magnet. According to one embodiment, the rotor core comprises a plurality of laminated plates. Each of the plates has a rim with a circular outer perimeter, a hub concentric with the outer perimeter of the rim, and first and second sets of curved spokes coupling the hub to the rim. Each spoke of the first set of curved spokes is concave in a clockwise direction and each spoke of the second set of curved spokes is concave in a counter-clockwise direction. According to another embodiment, the rotor core comprises a plurality of laminated structurally-identical perforated plates having obverse and reverse sides such that the obverse side of each plate faces the obverse side of an adjacent plate. In an especially preferred form, the plates include a plurality of arcuate perforations symmetrically distributed about a central axis of the rotor core. Adjacent arcuate perforations define arcuate spokes which support the magnet ring.

2 Claims, 1 Drawing Sheet

U.S. Patent — Mar. 24, 1998 — 5,731,648
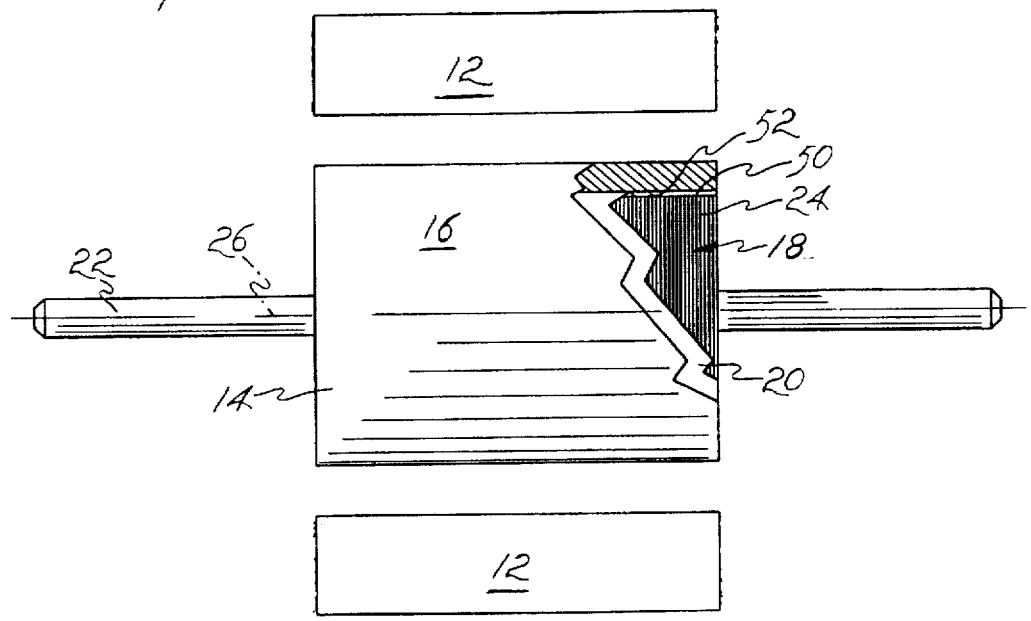

LAMINATED ROTOR CORE FOR MOUNTING PERMANENT RING MAGNETS

BACKGROUND OF THE INVENTION

1. Field of the Invention

The present invention pertains to electric motors, and more particularly to rotor cores for brushless direct-current ("DC") permanent magnet motors formed by laminating disc-shaped plates having perforations for relieving thermal stresses in the rotor core.

2. Description of the Related Art

A brushless DC permanent magnet motor typically consists of a stator winding surrounding a permanent magnet rotor which is mounted on a shaft for rotary or pivotal movement relative to the stator winding. The stator winding is coupled to a source of electrical power to generate a magnetic field within the stator winding. Means are provided for varying the magnetic field generated by the stator winding as the rotor moves so that the magnetic field generated by the stator winding "leads" the rotor as it rotates or pivots.

The rotors for brushless DC electric motors are typically formed from either ring magnets or from magnetic arc pieces secured to the outer surface of a metallic rotor core. Among the advantages of using ring magnets rather than magnetic arc pieces are lower part counts, simpler assembly and better product reliability. On the other hand, one problem with using ring magnets is that the thermal coefficient of expansion of the rotor core material tends to be greater than that of materials typically used for permanent magnets. For example, a typical value for the thermal coefficient of expansion for MAGNEQUENCH MQ2F neodymium magnet material is $3.5 \times 10^{-6}$ per °C., while a typical value of the thermal coefficient of expansion for M19 lamination steel is $10 \times 10^{-6}$ per °C. This difference in thermal expansivity limits the working temperature range of the motor since the magnet ring will rupture if the stresses generated by the expansion of the core become too great.

Anisotropic magnet materials present an even more difficult problem. The thermal coefficient of expansivity parallel to the direction of magnetization is different from the coefficient normal to the direction of magnetization in anisotropic materials. Very often, the thermal coefficient of expansivity is negative in the direction normal to magnetization. Thus, for example, the circumference of a radially-oriented ring magnet may decrease with increasing temperature. A ring magnet behaving in this fashion is especially vulnerable to stresses induced by the outward pressure of the rotor core.

Examples of rotor core constructions for electric motors and generators include those shown in Saito et al., U.S. Pat. No. 5,402,025; Watanabe et al., U.S. Pat. No. 5,402,024; Török, U.S. Pat. No. 5,047,680; Stokes, U.S. Pat. No. 4,594,525; Phelon et al., U.S. Pat. No. 3,258,623; Johnson Electric S.A., European Patent Application No. 650 241; BSR Ltd., British Patent Specification No. 2 007 146; Licentia Patent-Verwaltungs-GmbH, German Laid-Open Application No. 31 37 981; Magnetfabrik Bonn GmbH, German Laid-Open Patent Application No. 1 614 183; Japanese Laid-Open Application No. 6-331384; and Japanese Laid-Open Application No. 63-114550. In particular, Watanabe et al. proposes a rotor core formed from laminated perforated metal plates in order to control rotor vibration.

SUMMARY OF THE INVENTION

One aspect of the invention is a rotor core for use with a permanent ring magnet in an electric motor which serves to minimize and evenly distribute thermal stresses in the rotor without undermining the efficiency of the motor by distorting the flux return to the ring magnet. According to a first embodiment, the rotor core comprises a plurality of laminated plates. Each of the plates has a rim with a circular outer perimeter, a hub concentric with the outer perimeter of the rim, and first and second sets of curved spokes coupling the hub to the rim. Each spoke of the first set of curved spokes is concave in a clockwise direction and each spoke of the second set of curved spokes is concave in a counterclockwise direction.

In an especially preferred form, the plates are discs of ferromagnetic material including perforations defining the spokes. The spokes of either or both of the first and second sets are distributed evenly about an axis of the rotor core so as to define an angular spoke pitch equal to $2\pi$ radians divided by the number of spokes in that set. Each plate is rotated about the axis of the rotor core relative to an adjacent plate by an angle less than the angular spoke pitch.

According to a second embodiment, the rotor core comprises a plurality of laminated structurally-identical perforated plates having obverse and reverse sides arranged so that the obverse side of each plate faces the obverse side of an adjacent plate. In an especially preferred form, the plates are formed from disc-shaped plates of ferromagnetic material each including a plurality of arcuate perforations symmetrically distributed about a central axis of the rotor core. Adjacent arcuate perforations define arcuate spokes which support the magnet ring. It is desired that the spokes be asymmetric with respect to any radius line passing through the central axis of the rotor core, so that the arcuate perforations do not align when the obverse side of one plate faces the obverse side of an adjacent plate.

In both of the embodiments described, the spokes in the plates are curved so as to carry a torsional load, but are small enough so that they do not contribute significantly to the thermal stresses in the magnet ring. The plates of the first embodiment include sets of spokes curved in opposite annular directions to support torsional loads in either direction, while adjacent plates of the second embodiment are reversed so that each pair of adjacent plates includes spokes curved in opposite annular directions to support torsional loads in either direction. The flux return path through the rotor core of the first embodiment is primarily directed through the rim, with some flux returning through the spokes. The flux return path through the rotor core of the second path is primarily through the spokes. In either embodiment, the field power loss as compared to a core comprising solid disc-shaped plates is small. The relative rotation of adjacent plates in the first embodiment, and the reversal of adjacent plates in the second embodiment, improves the stiffness of the rotor core and the symmetry of the field return path. Therefore, the rotor core of the invention serves to minimize thermal stresses in the magnet ring without excessive power loss due to magnetic field distortion in the rotor.

The invention will be further described in conjunction with the appended drawings and following detailed description.

BRIEF DESCRIPTION OF THE DRAWINGS

FIG. 1 is a schematic view of a brushless DC electric motor incorporating a rotor according to the invention;

FIG. 2 is a front elevational view of a first embodiment of a plate for the rotor core of the invention;

FIG. 3 is a schematic view showing the relative orientations of adjacent plates of the type shown in FIG. 2 laminated into a rotor core;

FIG. 4 is a front elevational view of a second embodiment of a plate for the rotor core of the invention; and FIG. 5 is a schematic view showing the relative orientations of adjacent plates of the type shown in FIG. 2 laminated into a rotor core.

DETAILED DESCRIPTION OF THE PREFERRED EMBODIMENT

Referring initially to FIG. 1 of the drawings, a brushless DC electric motor 10 comprises a stator coil 12 and a rotor 14. The preferred stator coil 12, shown in block form, comprises a stator winding (not shown) supported on a laminated stator core (not shown), though the particular construction of the stator coil 12 is not critical to the invention. The rotor 14 includes a permanent magnet ring 16 mounted on a rotor core 18 by means of an adhesive 20. One adhesive useful in connection with the rotor of the invention is sold commercially under the name DYMAX 845 T. The rotor core 18 is fixed to a shaft 22. The rotor core 18 comprises a plurality of laminated structurally-identical disc-shaped plates 24 preferably composed of a ferromagnetic material such as iron or steel. The shaft 22 is supported on bearings (not shown) for rotation about a rotor core axis 26. Means such as a Hall effect sensor (not shown) are provided for measuring the rotation of the shaft 22 and controlling the magnetic field generated by the stator coil 12 in order to sustain the rotation of the permanent magnet ring 16 and the shaft 22.

An obverse surface of a first embodiment of a plate 24' for use in the rotor core 18 is shown in FIG. 2. The reverse surface is identical to the obverse surface. The plate 24' is disc-shaped and includes a plurality of annularly-elongated perforations 30 interleaved with a plurality of approximately trapezoidal perforations 32 which cooperate to define a rim 34 having a circular outer perimeter 36; a hub 38 concentric with the outer perimeter 36 and surrounding a central hole 40; and two sets of curved spokes 42, 44. The spokes of the first set of curved spokes 42 are concave in a clockwise or left-hand twist direction (i.e., the direction in which the fingers of the left hand curve when the left thumb is facing toward the observer), while the spokes of the second set of curved spokes 44 are concave in a counter-clockwise or right-hand twist direction.

Since each of the first and second sets of curved spokes 42, 44 includes four spokes evenly distributed about the center point 46, the first and second sets of curved spokes 42, 44 each defines an angular spoke pitch of 90° ($\pi/2$ radians). Indeed, the arrangement of the perforations 30, 32 and of the first and second sets of curved spokes 42, 44 is invariant with respect to a rotation of the plate 24' about the center point 46 by the angular spoke pitch 90°.

As best shown in FIGS. 2 and 3, plates 24', 124', 224' of the structure shown in FIG. 2 are laminated together in sets of three plates and stacked or laminated to form the rotor core 18 in such a way that each plate 24', 124', 242' (FIG. 3) is rotated by an angle of 30°, that is, by ⅓ of the angular spoke pitch 90°, relative to adjacent plates. (Portions of the plates 124', 224' are visible through the perforations 30, 32 in the plate 24' in FIG. 3). The center points 46 (FIG. 2) of the plates 24', 124', 224' are aligned and the shaft 22 (FIG. 3) engages the holes 40 (FIG. 2) in the plates 24', 124', 224' so that the rotor core axis 26 (FIG. 3) connects the center points 46 (FIG. 2) of the plates. Once the plates 24', 124', 224' have been laminated, the outer perimeters 36 (FIG. 2) of the plates 24', 124', 224' form a cylindrical outer surface 50 (FIG. 3) conforming to the cylindrical inner surface 52 (FIG. 1) of the permanent magnet ring 16 so that thermal stresses at the interface between the rotor core 18 and the permanent magnet ring 16 are distributed evenly about the cylindrical inner surface 52 (FIG. 1) of the permanent magnet ring 16.

Referring again to FIG. 2, the first and second sets of curved spokes 42, 44 (FIG. 2) are isomorphic in the sense that each of the perforations 32 defines a pair of adjacent spokes, one facing clockwise and the other facing counter-clockwise. Therefore, the plates 24' provide equal torsional support for the permanent magnet ring 16 in both the clockwise and counter-clockwise directions. On the other hand, the spokes 42, 44 are sufficiently thin that they do not contribute significantly to the thermal stresses acting on the permanent magnet ring 16. The flux return path to the permanent magnet ring 16 is primarily through the rim 34, with some flux passing through the spokes 42, 44.

An obverse surface of a second embodiment of a plate 24" for use in the rotor core 18 is shown in FIG. 4. The reverse surface of the plate 24" (not shown) is a mirror image of the obverse surface shown. The plate 24" is disc-shaped with a circular outer perimeter 60. The plate 24" includes a plurality of arcuate perforations 62 distributed evenly about a center point 64 of the outer perimeter 60 and a circular hole 66 concentric with the outer perimeter 60. Adjacent perforations 62 define curved spokes 68 having annular widths approximately twice the annular widths of the arcuate perforations 62. In an especially preferred embodiment, the annular sides of the perforations 62 and of the spokes 68 define involute curves. Since the perforations 62 are distributed evenly about the center point 64 and diverge arcuately from radii (not shown) of the plates 24", the perforations 62 are not symmetric with respect to any radius line.

As shown in FIGS. 4 and 5, plates 24", 124" of the structure shown in FIG. 4 are laminated together to form the rotor core 18 in such a way that the obverse side of each plate 24", 124" faces the obverse side of an adjacent plate thereby forming effectively a stacked set of plates in which pairs of plates have contiguous obverse faces and contiguous reverse faces. (Portions of plate 124" are visible in perforations 62 of plate 24" in FIG. 5.) The center points 64 (FIG. 4) of the plates 24", 124" are aligned and the shaft 22 (FIG. 5) engages the holes 66 in the plates 24", 124" so that the rotor core axis 26 (FIG. 5) connects the center points 64 (FIG. 4) of the plates 24", 124". Once the plates 24", 124" have been laminated, the outer perimeters 60 (FIG. 4) of the plates 24", 124" form a cylindrical outer surface 50 (FIG. 1) conforming to the cylindrical inner surface 52 (FIG. 1) of the permanent magnet ring 16 so that thermal stresses at the interface between the rotor core 18 and the permanent magnet ring 16 are distributed evenly about the cylindrical inner surface 52 (FIG. 1) of the permanent magnet ring 16.

Since adjacent plates 24", 124" are reversed in the rotor core 18, the curved spokes 68 of adjacent plates 24", 124" are concave in opposite annular directions and provide equal torsional support for the permanent magnet ring 16 in both the clockwise and counter-clockwise directions. On the other hand, the spokes 68, like the spokes 42, 44 of the first embodiment 24' of FIG. 2, are sufficiently thin that they do not contribute significantly to the thermal stresses acting on the permanent magnet ring 16. The flux return path to the permanent magnet ring 16 is primarily through the spokes 68.

Having described the invention in detail and by reference to preferred embodiments thereof, it will be apparent that modifications and variations are possible without departing from the scope of the appended claims.

What is claimed is:

1. In a rotor for an electric motor including a brittle permanent ring magnet supported on a rotor core in which the coefficient of thermal expansion of the rotor core is greater than the coefficient of thermal expansion of the permanent ring magnet, the improvement core for relief of thermal stress in the ring magnet and providing for support of torsional loads in either direction of rotation comprising a plurality of individual core plates formed in a plurality of sets of identical plates, said sets of plates being formed by at least two contiguous adjacent plates, each said plate having perforations defining concave arcuate spokes, said spokes having sides defining involute curves, in which some of the arcuate spokes in said sets of plates are concave in a clockwise direction with respect to the axis of rotation and others of said arcuate spokes in said sets of plates are concave in a counter-clockwise direction with respect to the axis of rotation and in which each said sets of plates comprise of a pair of said plates, in which said plates have an obverse face and reverse face, in which said pairs are positioned with one of said obverse and reverse face of one of said plates is contiguous with the identical face of the other plates of said pair of plates such that said arcuate spokes alternate in direction of curvature from one plate to the next.

2. In a rotor for an electric motor including a brittle permanent ring magnet supported by a rotor core such that a coefficient of thermal expansion of the rotor core is greater than a coefficient of thermal expansion of the permanent ring magnet, the improvement comprising a rotor core formed from a plurality of substantially identical plates each having a center point, an obverse face and reverse face, each plate having perforations defining arcuate spokes having sides defining involute curves extending clockwise when viewed at the obverse face and arranged such that the perforations are asymmetric with respect to any radius line passing through said center point parallel to the obverse face, and wherein the the rotor core is formed in a stack of plates and include adjacent pairs of plates having facing obverse faces and adjacent pairs of plates having facing reverse faces.

* * * * *